United States Patent
Gallops

(10) Patent No.: US 10,099,640 B1
(45) Date of Patent: Oct. 16, 2018

(54) PIVOTING BUMPER FOR VEHICLE

(71) Applicant: Gordon Scott Gallops, Spanish Fort, AL (US)

(72) Inventor: Gordon Scott Gallops, Spanish Fort, AL (US)

( * ) Notice: Subject to any disclaimer, the term of this patent is extended or adjusted under 35 U.S.C. 154(b) by 110 days.

(21) Appl. No.: 15/243,558

(22) Filed: Aug. 22, 2016

(51) Int. Cl.
*B60R 19/38* (2006.01)

(52) U.S. Cl.
CPC ................................ *B60R 19/38* (2013.01)

(58) Field of Classification Search
None
See application file for complete search history.

(56) References Cited

U.S. PATENT DOCUMENTS

| | | | | |
|---|---|---|---|---|
| 2,146,801 A | * | 2/1939 | De Orlow | B60R 19/46 293/145 |
| 2,469,816 A | * | 5/1949 | Dall | B60R 19/46 293/145 |
| 2,672,363 A | | 3/1954 | Buchanan | |
| 3,567,052 A | * | 3/1971 | Allen | B60R 9/06 224/924 |
| 3,746,383 A | | 7/1973 | Davis | |
| 3,989,292 A | * | 11/1976 | Bank | B60R 19/20 267/140 |
| 4,931,603 A | * | 6/1990 | Castonguay | H01H 1/5833 218/1 |
| 5,029,918 A | | 7/1991 | Albright et al. | |
| 5,132,662 A | * | 7/1992 | Burch | B60Q 1/50 180/271 |
| 5,358,157 A | * | 10/1994 | Abretske | B60R 9/06 224/42.13 |
| 6,209,940 B1 | * | 4/2001 | Jocher | B60R 19/24 280/154 |
| 6,416,112 B1 | | 7/2002 | Trivits | |
| 6,733,062 B1 | | 5/2004 | Albright et al. | |
| 2006/0197347 A1 | * | 9/2006 | Hoffman | B60R 19/56 293/102 |

* cited by examiner

*Primary Examiner* — Charlie Y Peng
(74) *Attorney, Agent, or Firm* — George L Williamson

(57) ABSTRACT

Method and apparatus for a pivoting bumper for attachment to the rear of a vehicle wherein the bumper is pivotable on one side having a latch on the opposing side so that the bumper can be pivoted away from the vehicle in order to access internal portions of the vehicle. The bumper is attached to the vehicle in a modular fashion using left and right opposing brackets which brackets would generally be expected to be bolted on to the vehicle. Each of the left and right brackets has a wing-shaped upper portion which projects outwardly so as to protect the vehicle against backing into an object. The pivoting latch portion has a hook on one end and a safety pin on the opposite end so that the bumper can be secured to the vehicle when the latch is in a latched position.

14 Claims, 3 Drawing Sheets

PIVOTING BUMPER FOR VEHICLE

BACKGROUND OF THE INVENTION

Field of the Invention

The present invention relates generally to vehicle appurtenances and, more particularly, is concerned with a pivoting bumper for a vehicle such as a skid-steer loader.

Description of the Related Art

Devices relevant to the present invention have been described in the related art, however, none of the related art devices disclose the unique features of the present invention.

In U.S. Pat. No. 6,733,062 dated May 11, 2004, Albright, et al., disclosed a combined tailgate and hinged engine cover. In U.S. Pat. No. 6,416,112 dated Jul. 9, 2002, Trivits disclosed a protective shield for off-road vehicles. In U.S. Pat. No. 5,029,918 dated Jul. 9, 1991, Albright, et al., disclosed a rear door and bumper for a skid-steer loader. In U.S. Pat. No. 2,672,363 dated Mar. 16, 1954, Buchanan disclosed a bumper with hinged section. In U.S. Pat. No. 3,746,383 dated Jul. 17, 1973, Davis disclosed an auxiliary bumper impact protector.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a bumper for attachment to the rear of a vehicle, e.g., a skid steer loader, wherein the bumper is pivotable on one side having a latch on the opposing side so that the bumper can be pivoted away from the vehicle in order to access internal portions of the vehicle such as the engine compartment. The present invention has a heavy duty bumper section disposed on the rear of the vehicle and is attached to the vehicle in a modular fashion using left and right opposing brackets which brackets would generally be expected to be bolted on to the vehicle, however, other means of attaching the brackets are possible. Each of the left and right brackets has a wing-shaped upper portion which projects outwardly so as to protect the vehicle against backing into an object such as a tree wherein the wing-shaped portion of the bracket would contact the tree so as to cause the vehicle to become spaced away from the tree after the wing-shaped portion contacted the tree. The latch portion of the present invention is made of heavy duty materials and pivots having a hook on one end and a safety pin on the opposite end so that the bumper can be secured to the vehicle when the latch is in a closed or latched position.

An object of the present invention is to provide a bumper for use on the rear end of a vehicle which provides for protection to the rear portion of the vehicle and the tracks of the vehicle. Another object of the present invention is to provide a bumper wherein the bumper can be pivoted away from the vehicle so as to allow access to the internal parts of the vehicle for maintenance. A further object of the present invention is to provide a bumper which can be easily operated by a user. A further object of the present invention is to provide a bumper which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
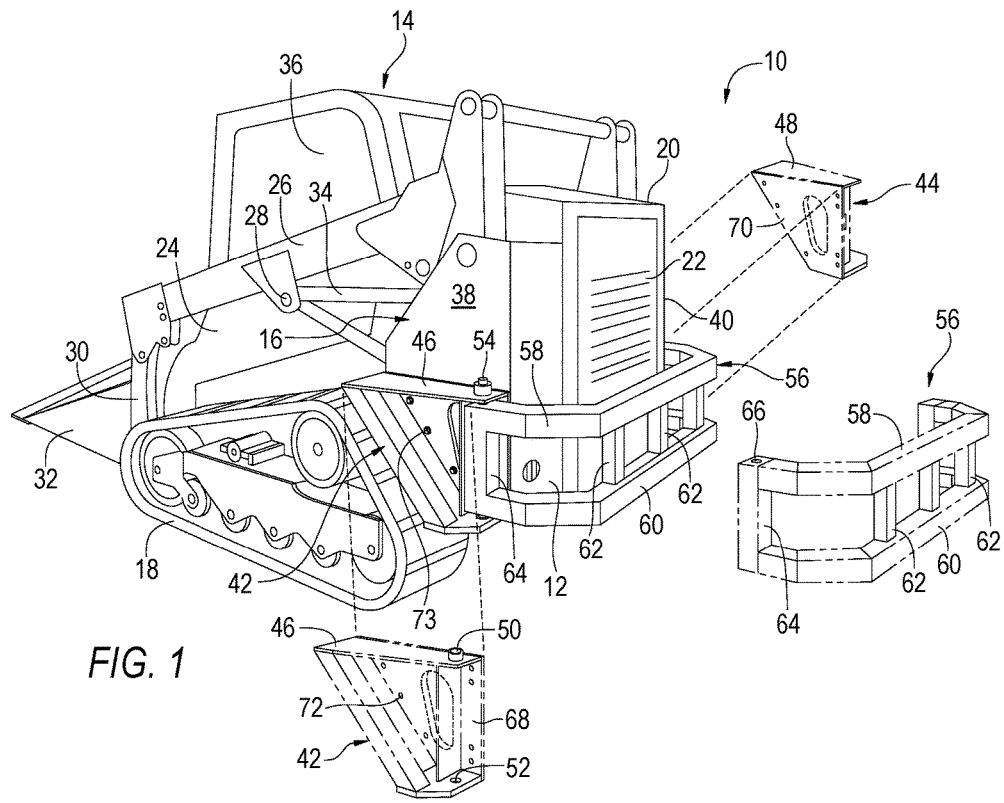
FIG. 1 is a perspective view of the present invention in operative connection also showing exploded portions of the present invention.

With regard to reference numerals used, the following numbering is used throughout the drawings.
- 10 present invention
- 12 rear end of vehicle
- 14 vehicle/skid steer loader
- 16 main frame
- 18 drive tracks
- 20 engine compartment
- 22 engine access panel
- 24 frame upright
- 26 lift arms
- 28 pivot points
- 30 attachment plate
- 32 bucket
- 34 lift cylinder arms
- 36 operator's area
- 38 left rear side portion
- 40 right rear side portion
- 42 left mounting bracket
- 44 right mounting bracket
- 46 left wing portion
- 48 right wing portion
- 50 upper aperture
- 52 lower aperture
- 54 pin 56 bumper
58 upper horizontal cross member
60 lower horizontal cross member
62 vertical cross member
64 end vertical cross member
66 apertures
68 left inner plate
70 right inner plate
72 aperture
73 bolts
74 latching mechanism
76 latch arm
78 pivot pin
80 hook tip
82 extension arm
83 safety pin
84 latch aperture
86 latch plate
88 cut out
90 miscellaneous structure
92 closed position
94 open position
96 downward position
98 upward position

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 8 illustrate the present invention wherein a pivoting bumper system for a vehicle is disclosed and which is generally indicated by reference number 10.

By way of general explanation, a skid-steer loader is a relatively small rigidly constructed, engine-powered machine having lift arms thereon which arms are used to attach a wide variety of construction-related attachments, e.g., a bucket. Skid-steer loaders are typically wheeled (or tracked) vehicles with the wheels mechanically locked in synchronization on each side so that the left-side drive wheels can be driven independently of the right-side drive wheels. The wheels typically have no separate steering mechanism and maintain a fixed straight alignment on the body of the machine. By operating the left and right wheel pairs at different speeds, the machine turns by skidding, or dragging its fixed-orientation wheels across the ground. The extremely rigidly constructed frame and strong wheel bearings prevent the torsional forces caused by this dragging motion from damaging the machine. Skid-steer loaders are capable of essentially zero-radius turning, which makes them extremely maneuverable and useful for applications that require a compact, agile loader. Skid-steer loaders may be equipped with tracks in lieu of the wheels. Unlike in a conventional front loader, the lift arms in skid-steer loaders are alongside the driver and the pivot points may be behind the driver's shoulders. Like other front loaders, it can push material from one location to another, carry material in its bucket or load material into a truck or trailer.

Turning in general to the present invention, the modular-bumper of the present invention generally has right and left wing plate assemblies that bolt on the opposite sides of the rear of the skid-steer loader or other construction equipment or vehicle such as an automobile, pickup truck or possibly the front or rear end of a wide variety of vehicles such as a tractor. The wing plate assemblies also have an integrated track guard to protect the rear section of the track assembly while the bumper frame protects the rear part of the machine. The bumper frame pivots on a pivot pin from the right or the left side of the machine. The bumper frame has two square or the like tubes running horizontally with vertical bracing for improved strength. The bumper frame pivots on a common pin and has a self-contained latch mechanism. This modular bumper system provides protection to the rear part of the machine and the tracks. The left and right sides of the present invention are defined from the viewpoint of what a person would observe while positioned behind and at the rear of the vehicle looking toward the front of the vehicle.

Figure 2:
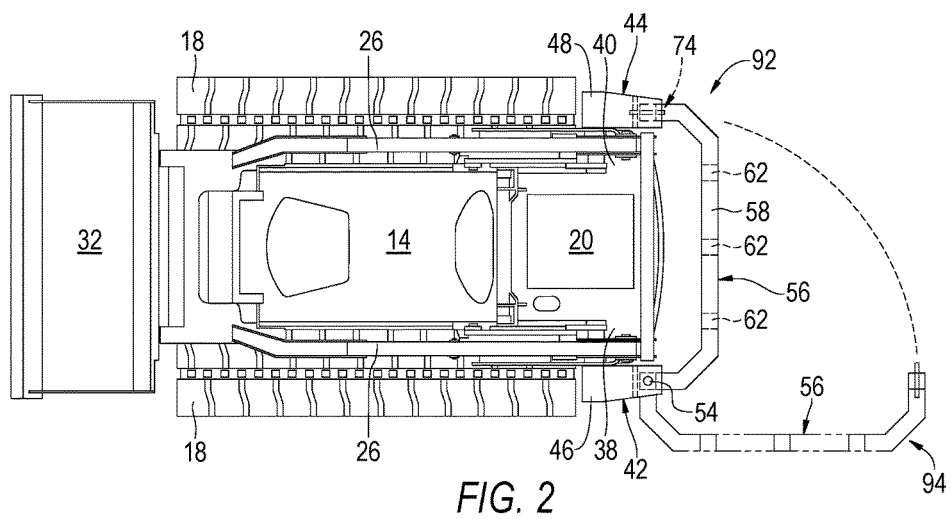
FIG. 2 is a plan view of the present invention shown in operative connection.

Turning to FIGS. 1-8, therein is the present invention 10 mounted onto the rear end 12 portion of a skid-steer loader or vehicle 14 having a main frame 16 which is constructed in a well-known manner as would be done in the standard manner by one skilled in the art which skid steer loader 14 includes left and right drive tracks 18 which are driven by an engine contained in an engine compartment 20 in the usual manner using a hydrostatic drive or like drive mechanism. The engine compartment 20 normally would have an engine access panel 22 which could be pivotable in the horizontal plane from either the left or right side portions of the panel or in the vertical plane from either the upper and lower portions of the panel. The main frame 16 would have frame uprights 24 on opposite sides of the skid steer loader 14 having mounted thereon pivotally mounting lift arms 26 which pivot about at least one and possibly multiple pivot points 28 mounted on the frame uprights 24. The front end of the lift arms 26 which may be telescoping lift arms, have a pivoting attachment plate 30 mounted thereon upon which may be mounted a variety of tools such as a bucket 32 as shown in FIG. 1. The lift arms 26 are normally moved about their pivots with some sort of lifting cylinders with telescoping arm portions which are shown by way of example at 34. Also shown is an operator's area 36 wherein the operator is contained so that he can operate the usual control levers, pedals, switches or the like for controlling the forward and rearward movement of the vehicle in the normal manner through the drive components of the vehicle 14. The vehicle 14 has a left and right rear side portion as shown in FIG. 2 and identified in general by reference numerals 38 and 40. Also shown is a left mounting bracket 42 and a right mounting bracket 44 which are expected to be bolted on using a plurality of bolts 73 to the left and right side portion 38, 40 of the vehicle 14. The left mounting bracket has a wing portion 46 thereon and the right mounting bracket has a wing portion 48 thereon which wing portions are intended to protect the tracks from various objects, e.g., a tree, which the vehicle 14 may encounter as it is backing up or moving in the rearward direction. It can be seen that the wing portions 46, 48 are disposed onto the upper portion of the left and right mounting brackets 42, 44 which wing portions are wider on the front end than the rear end being about the width of the tracks 18 on the front end. The left mounting bracket 42 has upper and lower apertures 50, 52 for receiving a mounting pin 54 therethrough which mounting pin provides the pivoting mechanism upon which the bumper assembly 56 pivots in the horizontal plane. It can be seen that the bumper 56 has an upper and lower horizontal bumper portion 58, 60 along with a plurality of connecting cross members 62 for providing strength to the bumper 56 and, additionally, has a vertical member 64 on its end having an aperture running from its upper to lower end 66 for receiving therethrough pin 54 upon which bumper 56 pivots. The respective mounting brackets 42, 44 each have a mounting plate 68, 70 positioned on the respective interiors which plates contain a plurality of apertures 72 through which the bolts 73 pass through so as to securely attach the left and right mounting brackets 42,44 to the left and right rear side portions, 38, 40 of the vehicle 14.

Figure 3:
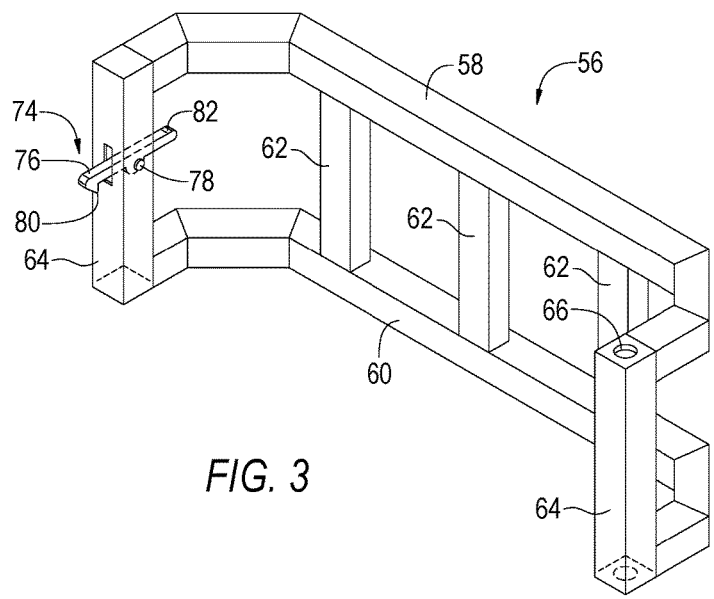
FIG. 3 is a front perspective view of portions of the present invention.
Figure 4:
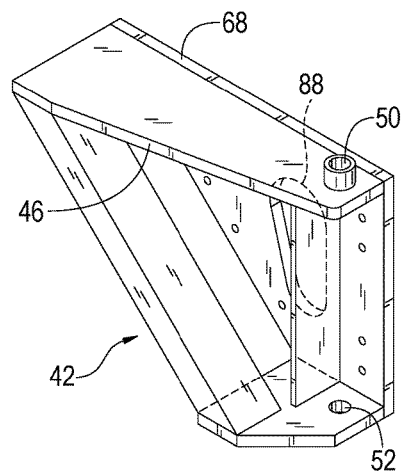
FIG. 4 is a rear perspective view of the outside of the left bracket portion of the present invention.
Figure 5:
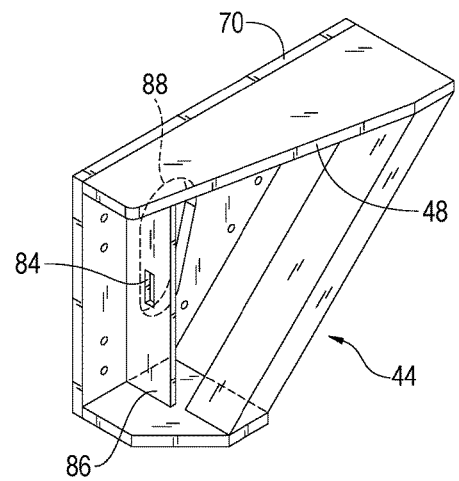
FIG. 5 is a rear perspective view of the outside of the right bracket portion of the present invention.
Figure 6:
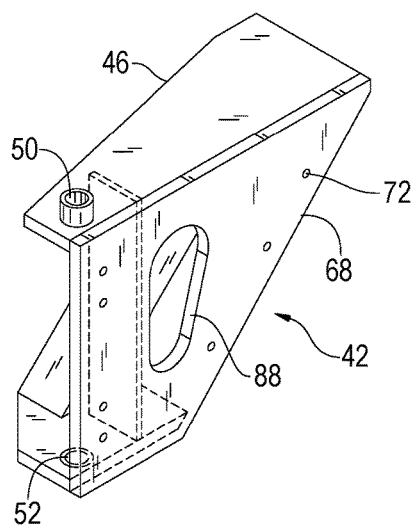
FIG. 6 is a rear perspective view of the inside of the left bracket portion of the present invention.
Figure 7:
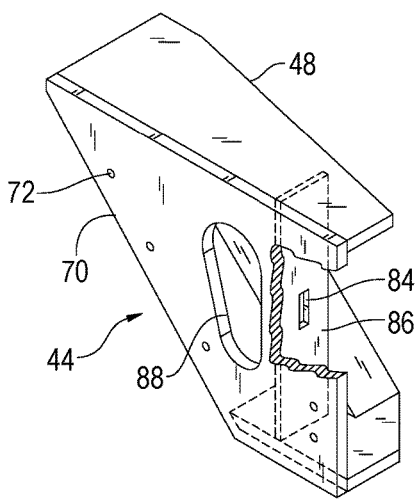
FIG. 7 is a rear perspective view of the inside of the right bracket portion of the present invention.
Figure 8:
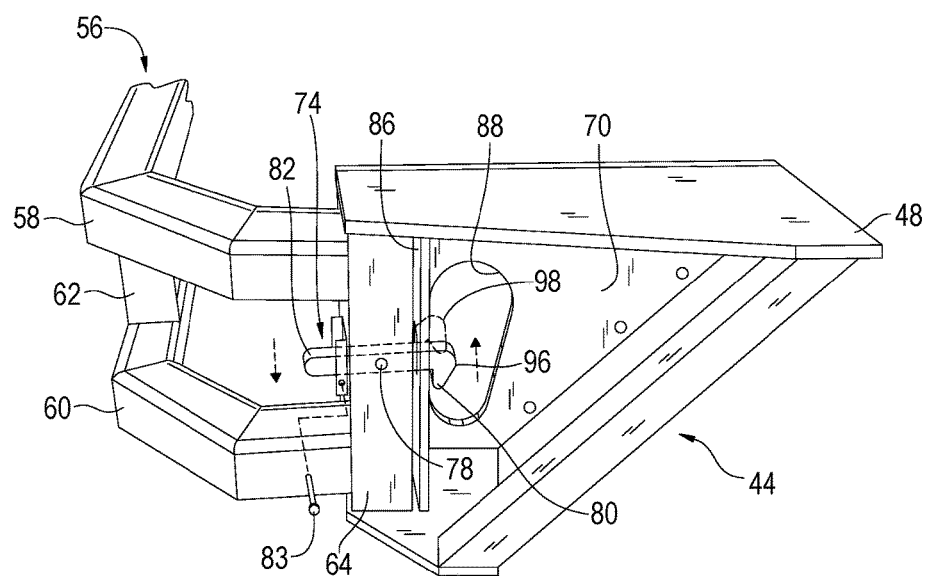
FIG. 8 is a perspective view taken from the right side of portions of the present invention.

As shown in FIG. 3, the right portion of the bumper 56 has a latch mechanism 74 thereon having a latch arm 76, which pivots about a pivot pin 78 in end vertical member 64 wherein the pivot pin 78 has a downwardly extending hook portion 80 on one end and an extension arm 82 on the other which arm 82 is intended to be grasped by the hand of a user to move the hook tip 80 up and down so that it can make contact with the right mounting bracket 44 as best shown in FIG. 8. The latching mechanism 74 is also shown in FIG. 8 showing the previously mentioned items along with a safety locking pin 83 which is disposed underneath the arm 82 of the latch arm 76 so that the hook tip 80 is disposed downwardly after it has passed through a latching aperture 84 disposed in a latch plate 86 which is secured to the right mounting bracket 44 shown in FIGS. 6 and 8. A cutout portion 88 is shown in the left and right inner plates 68, 70 which is provided so as to fit around a mating structure 90 (not shown) mounted onto the left and right rear sides of the skid steer loader.

Turning more specifically to FIG. 2, therein is shown the vehicle 14 having left and right rear side portions identified in general by reference numerals 38 and 40. Also shown is the bumper 56 having a first closed or latched position at 92 and an open, swung away position at 94 for access to the inside of the vehicle 14. Also shown is the pivot pin 54 and the latching mechanism 74. Other previously disclosed elements may also be shown.

Turning more specifically to FIG. 8, therein is shown the hook tip 80 of the latching mechanism 74 in a first downward, latched (closed) position 96 and a second upward, unlatched (open) position so that the bumper can be opened to allow access to the inner parts of the vehicle. Other previously disclosed elements may also be shown.

I claim:

1. A bumper for a vehicle, comprising:
   a) a frame portion having left and right end portions mounted on a rear portion of the vehicle, wherein said frame portion extends substantially from a left side portion of the vehicle to a right side portion of the vehicle, left and right ends of said frame portion extending around to enclose portions of left and right sides of said vehicle, each end of said frame portion having a vertical cross member, said bumper having upper and lower horizontal cross members joining each said vertical cross member to each other,
   b) a left mounting bracket disposed on a left side of the vehicle, and a right mounting bracket disposed on a right side of the vehicle, each of said left and right mounting brackets having a pair of spaced, outwardly extending wing portions;
   c) one said vertical cross member pivoting around a pivot pin extending between said spaced wing portions of said left mounting bracket, wherein said frame portion swings in a horizontal plane from a closed position surrounding said rear portion of said vehicle to an open position to provide access to a rear compartment of said vehicle; and,
   d) a latch mechanism disposed on said right end portion of said frame portion comprising a latch arm passing through and pivoting on a pin mounted in said vertical cross member in said right end of said bumper extending between said spaced wing portions of said right mounting bracket a distal end of said latch arm having a hook tip for engaging an edge of a latch aperture in said right mounting bracket, with a removable pin mounted adjacent an extension arm of said latch arm to prevent unintentional release of said latch arm so that said right end portion is removably secured to said right mounting bracket.

2. The bumper of claim 1, further comprising a wing plate portion disposed on each said left and right mounting bracket to protect the left and right rear portion of the vehicle when the vehicle is moving in a backward direction.

3. The bumper of claim 2, wherein said left end portion of said frame portion has an aperture therein and said left mounting bracket has a mating aperture therein, wherein said pivot pin extends through said frame portion aperture and said left mounting bracket aperture so that said frame portion swings on said pivot pin back and forth between said closed position and said open position.

4. The bumper of claim 3, further comprising a latch plate disposed on said right mounting bracket having said latch aperture therein so that said hook can pass through said aperture.

5. A method for a bumper for a vehicle, comprising the steps of:
   a) providing a frame portion having the left and right end portions for mounting on a rear portion of the vehicle, wherein the frame portion extends substantially from a left side portion of the vehicle to a right side portion of the vehicle, left and right ends of said frame portion extending around to enclose portions of left and right sides of said vehicle, each end of said frame portion having a vertical cross member, said bumper having upper and lower horizontal cross members joining each said vertical cross member to each other;
   b) providing a left mounting bracket on a left side of the vehicle, and a right mounting bracket on a right side of the vehicle, each of said left and right mounting brackets having a pair of spaced, outwardly extending wing portions;
   c) pivoting said vertical cross member around a pivot pin extending between said spaced wing portions of said left mounting bracket so that the frame portion swings in a horizontal plane from a closed position surrounding said rear portion of said vehicle to an open position to provide access to a rear compartment of said vehicle; and,
   d) latching the right end portion of the frame portion to the right mounting bracket so that the right end portion is removably secured to the right mounting bracket using a latch mechanism comprising a latch arm passing through and pivoting on a vin mounted in said vertical cross member in said right end of said bumper extending between said spaced wing portions of said right mounting bracket, a distal end of said latch arm having a hook tip for engaging an edge of a latch aperture in said right mounting bracket, with a removable pin mounted adjacent an extension arm of said latch arm to prevent unintentional release of said latch arm.

6. The method of claim 5, further comprising the step of providing a wing plate portion on each left and right mounting bracket to protect the left and right rear portion of the vehicle when the vehicle is moving in a backward direction.

7. The method of claim 6, wherein the left end portion of the frame portion has an aperture therein and the left mounting bracket has a mating aperture therein, wherein said pivot pin extends through the frame portion aperture and the left mounting bracket aperture so that the frame portion swings on the pivot pin back and forth between the closed position and the open position.

8. The method of claim 7, further comprising the step of providing a latch plate on the right mounting bracket having an aperture therein so that the hook can pass through the aperture so that the right end portion of the frame portion can be removably secured to the right mounting bracket.

9. A bumper for a vehicle, comprising:
 a) a frame portion having left and right end portions for mounting on a rear portion of the vehicle, wherein said frame portion extends substantially from a left side portion of the vehicle to a right side portion of the vehicle;
 b) a left mounting bracket disposed on a left rear portion of the vehicle, and a right mounting bracket disposed on a right rear portion of the vehicle;
 c) said left end portion of said frame portion adapted for pivotal connection to said left mounting bracket, wherein said frame portion swings in a horizontal plane from a closed position to an open position;
 d) a latch mechanism disposed on said right end portion of said frame portion so that said right end portion is removably secured to said right mounting bracket;
 e) a wing plate portion disposed on each said left and right mounting bracket to protect the left and right rear portion of the vehicle when the vehicle is moving in a backward direction;
 f) said left end portion of said frame portion has an aperture therein and said left mounting bracket has a mating aperture therein, wherein a pivot pin extends through said frame portion aperture and said left mounting bracket aperture so that said frame portion swings on said pivot pin back and forth between said closed position and said open position;
 g) a latch arm disposed on said latch mechanism, said latch arm being pivotally connected to said right end portion of said frame portion, said latch arm having an extension arm on a first end and a hook on a second end so that said extension arm is movable back and forth between a latched position and an unlatched position;
 h) a latch plate disposed on said right mounting bracket having an aperture therein so that said hook can pass through said aperture so that said right end portion of said frame portion can be removably secured to said right mounting bracket;
 i) a safety pin being removably disposed in said latch mechanism to permit said extension arm to be secured so that said hook is in said latched position;
 j) said frame portion of the bumper has a plurality of horizontal members and a plurality of vertical members interconnecting said horizontal members; and
 k) a vertical member disposed on each of said left and right end portions of said frame portion of the bumper, wherein said pivot pin extends through said left end vertical member and said latch mechanism is disposed on said right end vertical member.

10. The bumper of claim 9, wherein each said wing plate portion extends laterally away from the vehicle to protect the left and right rear portions of the vehicle when the vehicle is moving in a backward direction.

11. The bumper of claim 10, wherein each said left and right mounting bracket is attached to the vehicle using bolts.

12. A method for a bumper for a vehicle, comprising the steps of:
 a) providing a frame portion having the left and right end portions for mounting on a rear portion of the vehicle, wherein the frame portion extends substantially from a left side portion of the vehicle to a right side portion of the vehicle;
 b) providing a left mounting bracket on a left rear portion of the vehicle, and a right mounting bracket on a right rear portion of the vehicle;
 c) adapting the left end portion of the frame portion for pivotal connection to the left mounting bracket so that the frame portion swings in a horizontal plane from a closed position to an open position; and,
 d) latching the end portion of the frame portion to the right mounting bracket so that the right end portion is removably secured to the right mounting bracket;
 e) providing a wing plate portion on each left and right mounting bracket to protect the left and right rear portion of the vehicle when the vehicle is moving in a backward direction;
 f) wherein the left end portion of the frame portion has an aperture therein and the left mounting bracket has a mating aperture therein, wherein a pivot pin extends through the frame portion aperture and the left mounting bracket aperture so that the frame portion swings on the pivot pin back and forth between the closed position and the open position;
 g) providing a latch arm on the latch mechanism, the latch arm being pivotally connected to the right end portion of the frame portion, the latch arm having an extension arm on a first end and a hook on a second end so that the extension arm is movable back and forth between a latched position and an unlatched position;
 h) providing a latch plate on the right mounting bracket having an aperture therein so that the hook can pass through the aperture so that the right end portion of the frame portion can be removably secured to the right mounting bracket;
 i) providing a safety pin being removably disposed in the latch mechanism to permit the extension arm to be secured so that the hook is in the latched position;
 j) wherein the frame portion of the bumper has a plurality of horizontal members and a plurality of vertical members interconnecting the horizontal members; and
 k) providing a vertical member on each of the left and right end portions of the frame portion of the bumper, wherein the pivot pin extends through the left end vertical member and the latch mechanism is disposed on the right end vertical member.

13. The method of claim 12, wherein each wing plate portion extends laterally away from the vehicle to protect the left and right rear portions of the vehicle when the vehicle is moving in a backward direction.

14. The method of claim 13, further comprising the step of bolting each left and right mounting bracket onto the vehicle.

\* \* \* \* \*